(12) United States Patent
Sierra et al.

(10) Patent No.: US 11,057,210 B1
(45) Date of Patent: Jul. 6, 2021

(54) DISTRIBUTION AND RECOVERY OF A USER SECRET

(71) Applicant: Apple Inc., Cupertino, CA (US)

(72) Inventors: Yannick L. Sierra, San Francisco, CA (US); Mitchell D. Adler, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/550,836

(22) Filed: Aug. 26, 2019

Related U.S. Application Data

(63) Continuation-in-part of application No. 15/271,157, filed on Sep. 20, 2016, now abandoned.

(60) Provisional application No. 62/235,341, filed on Sep. 30, 2015.

(51) Int. Cl.
*H04L 9/08* (2006.01)
*H04L 9/32* (2006.01)
*H04L 9/30* (2006.01)

(52) U.S. Cl.
CPC ............ *H04L 9/0894* (2013.01); *H04L 9/085* (2013.01); *H04L 9/3073* (2013.01); *H04L 9/3226* (2013.01); *H04L 9/3247* (2013.01); *H04L 9/3271* (2013.01)

(58) Field of Classification Search
CPC ..... H04L 9/0894; H04L 9/0825; H04L 9/085; H04L 63/061
See application file for complete search history.

(56) References Cited

U.S. PATENT DOCUMENTS

| | | | |
|---|---|---|---|
| 5,276,737 A | 1/1994 | Micali | |
| 5,675,649 A | 10/1997 | Brennan et al. | |
| 5,764,767 A | 6/1998 | Beimel et al. | |
| 5,815,573 A | 9/1998 | Johnson et al. | |
| 6,748,084 B1 | 6/2004 | Gau et al. | |
| 7,167,565 B2 | 1/2007 | Rajasekaran | |
| 8,085,936 B2 | 12/2011 | Peel et al. | |
| 8,731,203 B2 | 5/2014 | D'Souza | |
| 2001/0050990 A1* | 12/2001 | Sudia | G06Q 20/3829 380/286 |
| 2004/0117649 A1* | 6/2004 | Whyte | H04L 9/0891 380/286 |
| 2012/0321086 A1 | 12/2012 | D'Souza et al. | |

OTHER PUBLICATIONS

US 5,315,659 A, 05/1994, Micali (withdrawn)

(Continued)

*Primary Examiner* — Paul E Callahan
(74) *Attorney, Agent, or Firm* — Kilpatrick Townsend & Stockton LLP

(57) ABSTRACT

A user device can segment a secret (e.g., a data recovery key) into a master segment and a shared segment such that possession of both segments is necessary and sufficient to reconstruct the secret. The user device can provide the master segment to a server system. The user device can further segment the shared segment to generate a set of M shares such that any subset of the shares that includes at least a threshold number t of the shares can be used to reconstruct the shared segment, while fewer than t shares provide no information about the shared segment. The M shares can be distributed to shareholder devices. To reconstruct the secret, a recovery device can obtain the master segment and at least t of the M shares, then reconstruct the secret.

20 Claims, 9 Drawing Sheets

(56) References Cited

OTHER PUBLICATIONS

Schoenmakers, Berry "A Simple Publicly Verifiable Secret Sharing Scheme and its Application to Electronic Voting." In Advances in Cryptology—CRYPTO '99, vol. 1666 of Lecture Notes in Computer Science, Springer-Verlag, 1999. pp. 148-164.

D'Souza, Roy et al. "Publicly Verifiable Secret Sharing for Cloud-based Key Management." Dec. 11, 2011. 20 pages.

Non-Final Office Action dated Feb. 25, 2019 in U.S. Appl. No. 15/271,157. 11 pages.

* cited by examiner

DISTRIBUTION AND RECOVERY OF A USER SECRET

CROSS-REFERENCE TO RELATED APPLICATION

This application is a continuation in part of U.S. patent application Ser. No. 15/271,157, filed Sep. 20, 2016, which claims the benefit of U.S. Provisional Application No. 62/235,341, filed Sep. 30, 2015, the disclosures of which are incorporated herein by reference in their entirety.

BACKGROUND

The present disclosure relates generally to data recovery and in particular to distribution and recovery of a user secret.

Individuals are conducting more and more activity online, from banking to commerce to data storage and retrieval. In a situation where an individual is likely to conduct multiple transactions with a particular service provider, the individual is typically invited to establish a user account with the service provider. The user account can store personal information about the individual user (e.g., name, email address, surface mail address, phone number, billing information such as a credit card number, and so on). In some instances, having an account may be required to use the services of the service provider.

For a number of reasons, it is desirable to protect user accounts and associated data from being accessed by anyone other than the authorized user. Accordingly, account creation typically includes establishing a user identity (e.g., a so-called "username") and a security credential (e.g., a password) for the account. The security credential is intended to be kept secret from everyone except the authorized user (and in some instances the service provider, depending on the security protocols used). In a "normal" login procedure defined by the service provider, the user can access the account by presenting the username and security credential (or satisfactory proof of having the security credential, depending on the security protocols) to the service provider. In some embodiments, some or all user data associated with the account may be secured, e.g., through encryption using a key that is held exclusively by the user (e.g., stored on a user device).

Such protection is known to be less than perfect. For example, a user may forget the password or lose a device on which the password is stored, which can prevent the user from accessing the account using the normal login procedure. Or in some cases, the secrecy of a security credential may be compromised (e.g., a password can be stolen), which may allow unauthorized parties to access the user account. Further, if the encryption key for the user data is stored exclusively on a user device, any loss or destruction of the user device may result in loss of the key.

Many service providers, therefore, find it useful to allow the user to enroll the user account in a recovery service. In cases where the account includes encrypted data, the service provider can store a "recovery" key that can be used to regain access to the data. The recovery service can define alternative protocols for verifying the user's identity in case the normal login procedure becomes unusable. If these alternative protocols are completed successfully, the user can be allowed to access the account and the recovery key.

SUMMARY

In systems where the service provider stores the recovery key, there is a risk of the recovery key being accessed without authorization of the user, for instance by a renegade employee of the service provider or due to a hacker defeating the security measures established by the service provider. While most service providers endeavor to prevent unauthorized access, the existence of the recovery key creates a nonzero risk.

Certain embodiments of the present invention relate to reducing the risk of anyone gaining access the recovery key (or other user secret) without the user's knowledge or consent. In some embodiments, the user device can generate the recovery key during enrollment in the recovery service. The user device can segment the recovery key into two segments, referred to herein as a "master" segment and a "shared" segment. Various segmentation algorithms can be used, provided that possession of all of the resulting segments is necessary and sufficient to enable reconstruction of the recovery key. The user device can provide the master segment to the service provider for secure storage. The user device can further segment the shared segment using a secret sharing algorithm to generate a set of M "shares," for some number M>2. The M shares can have the property that any subset of the shares that includes at least t of the shares (for some preselected number t≤M) can be used to reconstruct the shared segment, while fewer that t shares provide no information about the shared segment (and no information about the recovery key). The user can select a number M of "shareholders" (who can be, e.g., individuals that the user knows and trusts), and the M shares can be distributed to user devices belonging to the selected shareholders (referred to herein as "shareholder devices"), such that each shareholder device receives a different one of the M shares.

Various types of secret sharing algorithms can be used. For example, a "threshold" secret sharing algorithm has the property that t (the minimum number of shares to reconstruct the secret) is less than M (the total number of shares). This can allow reconstruction of the shared segment in situations where fewer than all of the shareholders can be contacted, provided that at least t of them can provide their shares. A "verifiable" secret sharing algorithm has the additional property that it is possible for at least one entity (e.g., the user device) in the system to audit the shareholders and confirm that recovery of the shared segment is possible without exposing the secret. A publicly verifiable secret sharing ("PVSS") algorithm has the additional property that the audit can be performed by anyone in in the system, including the service provider, the user device, or any of the shareholder devices.

To obtain the recovery key, the user can operate a recovery device (which might be the same device used for enrollment or a different device as desired). Using the recovery device, the user can perform identity verification with the recovery service and obtain the master segment of the recovery key. The recovery device can also communicate with at least t of the shareholder devices to obtain their shares of the shared segment of the recovery key. In some embodiments, this can include an out-of-band communication between the user attempting to recover and the shareholder to whom the shareholder device belongs, which can provide further verification of the user's identity. In some embodiments, the recovery service can make release of the master segment contingent upon the recovery device successfully reconstructing the shared segment. Once the recovery device has the master segment and at least t shares of the shared segment, the recovery device can reconstruct the recovery key, allowing the recovery device to access data protected by the recovery key.

In some embodiments, the recovery key is generated on the user device during enrollment and is not provided to any other device at any point. Assuming the user device destroys the recovery key after providing the master segment to the recovery service and the M shares of the shared segment to the shareholder devices, the only way to obtain the recovery key is by obtaining the master segment and at least t of the M shares of the shared segment. This can significantly reduce the risk of anyone obtaining the recovery key without the user at least becoming aware of the attempt.

Use of threshold secret sharing algorithms or similar techniques to create shares of the shared segment of the recovery key can allows recovery of the shared segment with the cooperation of fewer than all of the shareholder devices. This can be convenient because some of the shareholders (or their devices) might not be available when recovery is desired. For instance, a shareholder might be unreachable at the time when a share is needed, or a shareholder device might be lost (and its share with it). The number of shares M and the minimum number t needed for reconstructing the shared segment of the recovery key can be chosen as desired; larger M and larger t relative to M may provide greater security but may also make recovery more difficult. Further, use of verifiable secret sharing algorithms allows for monitoring to detect situations in which the secret may become unrecoverable (e.g., if several shareholders lose their devices).

Techniques described herein can also be applied to protect user secrets other than a recovery key. In general, any user secret that is representable as computer-readable data can be distributed among a set of at least three participating devices (one of which can be a "mandatory" participant that holds a master segment of the secret, the rest of which can be "optional" participants that hold shares of a shared segment of the secret) and later reconstructed in the manner described herein, The following detailed description together with the accompanying drawings will provide a better understanding of the nature and advantages of the present invention.

DETAILED DESCRIPTION

Figure 1:
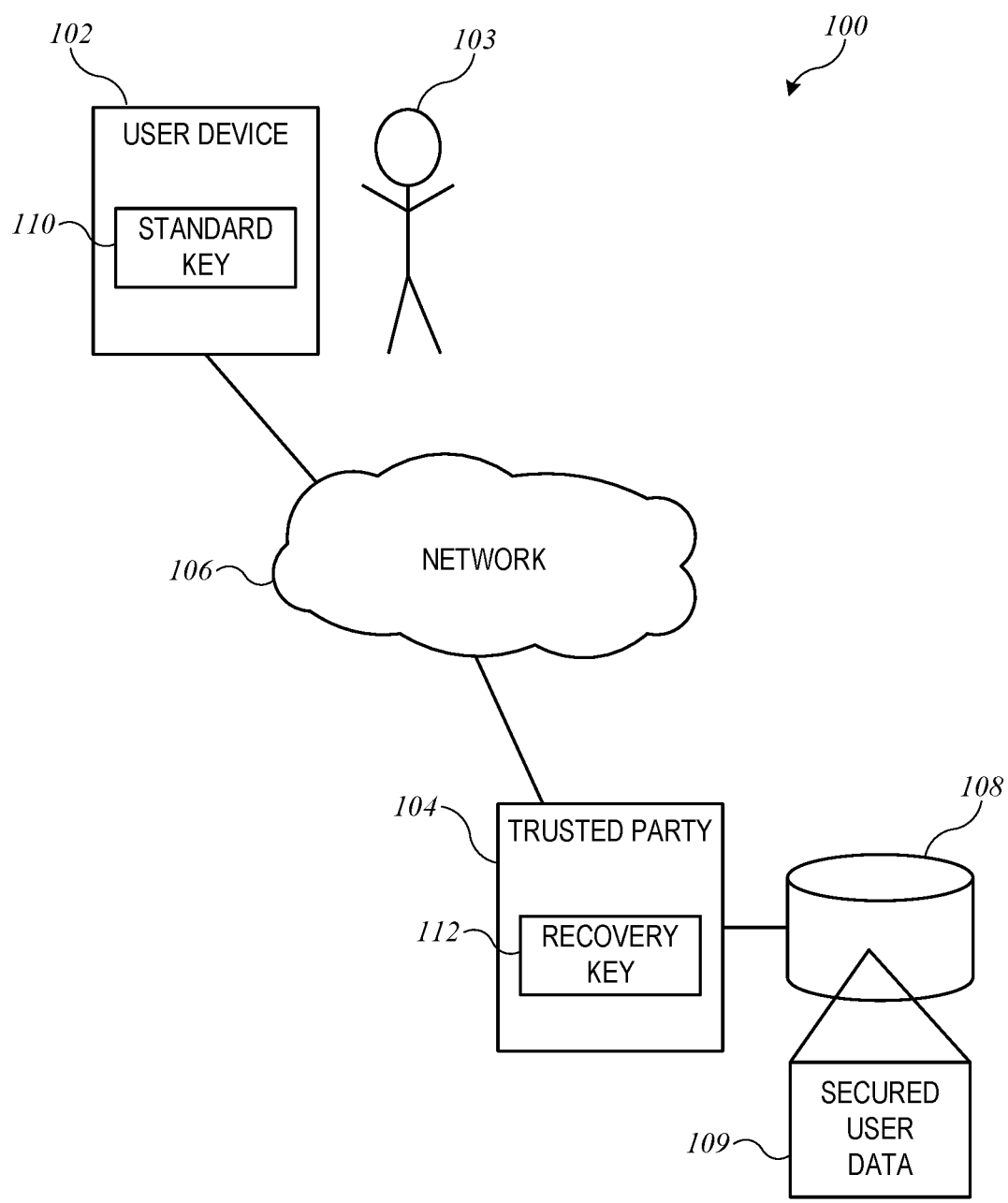
FIG. 1 shows a simplified example of a conventional data access system.

FIG. 1 shows a simplified example of a conventional data access system 100. A user device 102 (e.g., a personal computer, tablet computer, mobile phone, or the like) belonging to a user 103 communicates with a trusted party 104 (e.g., a server system operated by an online service provider) via a network 106 (e.g., the Internet). Trusted party 104 maintains a data repository 108 to store secured user data 109 on behalf of a user of user device 102. The particular nature of secured user data 109 is not relevant to the present disclosure; examples can include passwords established by user 103 for accessing various online services, financial account information such as a credit card number, medical information, photographs, or any other information whose distribution user 103 may wish to control. Trusted party 104 can implement a security protocol such that secured user data 109 in repository 108 is accessible by use of standard key 110, which is held by user device 102 as a protected secret.

If user 103 loses user device 102, or if user device 102 becomes inoperable, standard key 110 may be lost with it, and this may prevent user 103 from accessing secured user data 109. To allow user 103 to recover access to secured user data 109 without standard key 110, trusted party 104 can establish and maintain a recovery key 112. If, after losing user device 102 user 103 can satisfactorily prove her identity to trusted party 104, trusted party 104 can provide recovery key 112 to user 103 (or more precisely to a device operated by the user, which might or might not be the same user device 102), allowing the user to regain access to secured user data 109.

One potential point of vulnerability in system 100 is recovery key 112. For example, a hacker (e.g., an external hacker or a rogue employee of trusted party 104) may be able to obtain recovery key 112 and access secure user data 109 without the consent of user 103. Trusted party 104 may implement security measures to prevent unauthorized access, but reducing the risk to zero has proven to be an elusive goal.

Certain embodiments of the present invention can provide a less vulnerable secret-recovery mechanism. Rather than trusting a single entity to securely retain a user secret (such as a recovery key), information usable to reconstruct the user secret can be distributed among multiple participants such that none of the participants has enough information to reconstruct the user secret, but the user secret can be reconstructed by gathering information from a sufficient number of the participants. In some embodiments, the multiple participants can include a server system maintained by an online service and a number (M) of "shareholder" devices. When a user secret (e.g., a recovery key) is established, the user secret can be subjected to various mathematical algorithms to generate a set of information items that are jointly usable to reconstruct the user secret but that separately provide no information about the user secret. These information items can be distributed among the participants such that each participant has only one of the information items. In order to recover the user secret, a "recovery device" can collect information items from a sufficient number of the participants (which can be fewer than all of them, as described below) and can reconstruct the user secret using the collected information items.

Figure 2:
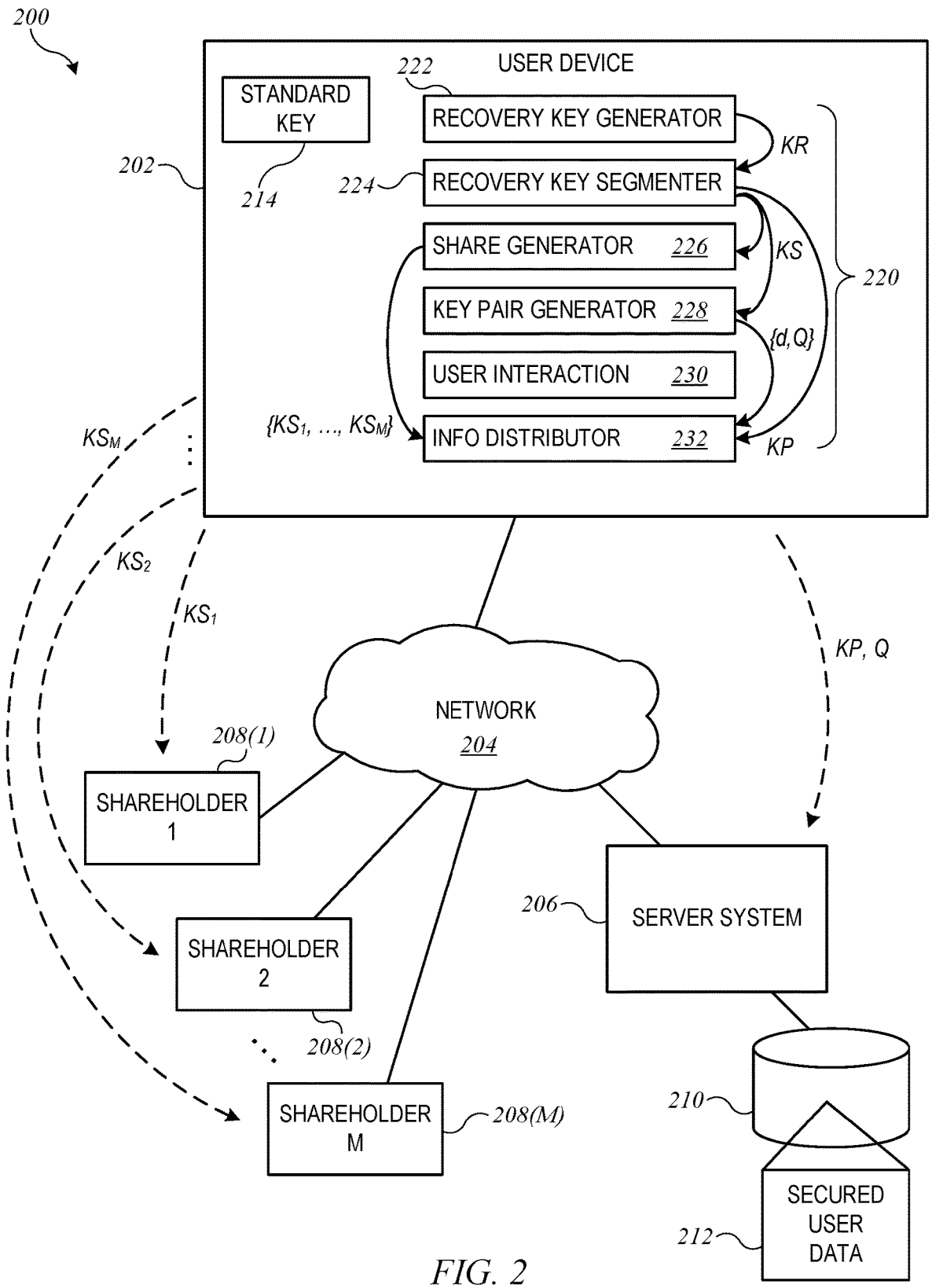
FIG. 2 shows a simplified example of operation of a system during enrollment in a recovery service according to an embodiment of the present invention.

The process of generating and distributing information items usable to reconstruct a recovery key or other user secret is referred to herein as "enrollment" in a recovery service. FIG. 2 shows a simplified example of operation of a system 200 during enrollment in a recovery service according to an embodiment of the present invention. In this example, a user device 202 generates a recovery key, then processes the recovery key to produce a set of information items. These information items are distributed by user device 202 via network 204 to a server system 206 and a set of M shareholder devices 208(1)-208(M).

Server system 206 can include a server or server farm operated by or on behalf of a service provider. Depending on implementation, the service provider can be capable of providing various types of service to users. For example, the service provider can provide "cloud-based" data storage and retrieval services (e.g., data backup services, storage of large files, storage of shared files), commercial services (e.g., purchasing of goods), communication services (e.g., email, text messaging, instant messaging), social media services (e.g., blog hosting, microblogging, etc.), financial services (e.g., banking or payment services), media access services (e.g., streaming music and/or video) or any other type of service that a user may interact with on a repeat basis. In the example shown, server system 206 can maintain a data repository 210 that stores secured user data 212 that is intended to be readable only by the user. During account creation, user device 202 can establish standard key 214 that is usable to access secured user data 212. Standard key 214 can be securely stored in local storage of user device 202 and not communicated to any other device. In some embodiments, user device 202 can require the user to manually confirm any attempt to access standard key 214, making it unlikely that someone else could obtain standard key 214 without the user's consent.

User device 202 can include any type of user-operable electronic device that is capable of communicating with other devices (e.g., server system 206) via network 204. For example, user device 202 can be a desktop computer, laptop computer, smart phone, other mobile phone, tablet computer, wearable computing device, or the like.

For purposes of enrollment in a recovery service provided by server system 206, user device 202 can include enrollment code modules 220, which can be implemented, e.g., as software or firmware programs executing on a programmable processor. Enrollment code modules 220 can include recovery key generator 222, recovery key segmenter 224, share generator 226, key pair generator 228, user interaction module 230, and information distributor 232.

Recovery key generator 222 can generate a recovery key ("KR") that is usable to recover access to secured user data 212 in the event that standard key 214 is lost. Standard techniques for generating a recovery key can be used. Further, techniques described herein can be used to protect other secret information (not limited to a recovery key or any other key), and recovery key generator 222 can be replaced by other code modules to generate any type of secret information.

Recovery key segmenter 224 can generate "segments" from the recovery key KR. In examples described herein, recovery key segmenter 224 generates two segments, referred to as a "primary key segment" ("KP") and a "shared key segment" ("KS"), by applying an algorithm. Other embodiments can generate more than two segments. The generated segments have the property that knowledge of all segments (KP and KS in examples described herein) and the segmentation algorithm is sufficient to reconstruct recovery key KR, while knowledge of fewer than all segments (e.g., only KP or only KS) provides no information about recovery key KR, even if the segmentation algorithm is known. For example, if recovery key KR can be represented as binary digital data, segments KP and KS can be generated using an algorithm that produces KP and KS such that a bitwise logical XOR of KP and KS yields KR (which can be done, e.g., by selecting at random one of the possible pairs of bit values for which the XOR operation yields the corresponding bit of KR). Since there are many possible pairs of bit sequences KP and KS that yield a given KR, knowledge of either KP or KS alone would not facilitate reconstruction of KR, even if it were known that KR=XOR(KP, KS). Other algorithms can also be substituted.

Share generator 226 can generate a set of M "shares" $\{KS_1, KS_2, \ldots, KS_M\}$ from shared key segment KS. The number of shares (M) can be chosen as desired; in some embodiments, the number M is at least 3. In some embodiments, share generator 226 can implement a secret sharing algorithm, examples of which are known in the art. Secret sharing algorithms suitable for use in share generator 226 can include any algorithm that has the following properties: (1) that KS (the secret that is input to the secret sharing algorithm) is reconstructible from any subset of the shares that includes at least t of the shares for some threshold number t≤M; and (2) that KS is not reconstructible from any subset of the shares that includes fewer than t of the shares. In some embodiments, the secret sharing algorithm can be a "threshold" secret sharing algorithm, which has the further property that t (the minimum number of shares to reconstruct the secret) is less than M (the total number of shares). As described below, this can allow reconstruction of the shared segment KS in situations where fewer than all of the shareholders can be contacted, provided that at least t of them can provide their shares. In some embodiments, the secret sharing algorithm can be a verifiable secret sharing algorithm, which is a secret sharing algorithm with the further property that it is possible for at least one entity (e.g., the user device) in the system to audit the shareholders and confirm that recovery of shared segment KS is possible without knowing or learning KS. In some embodiments, the secret sharing algorithm is a publicly verifiable secret sharing ("PVSS") algorithm, which is a verifiable secret sharing algorithm with the further property that any device in the system can verify the correctness of any or all of the shares without knowing or learning KS. One example of a PVSS algorithm is described in Berry Schoenemakers, "A Simple Publicly Verifiable Shared Secret Sharing Scheme and its Application to Electronic Voting," in *Advances in Cryptology—Crypto '99*, Vol 1666 of *Lecture Notes in Computer Science*, Springer-Verlag, 1999, pp. 148-164; other secret sharing algorithms can be substituted. In embodiments described herein, the threshold number t can be chosen as desired. Various considerations applicable to the selection of threshold t and number of shares M are described below.

Key pair generator 228 can generate a private/public key pair $\{d, Q\}$ using shared key segment KS. Conventional cryptographic key pair generation algorithms can be used, provided that the same input KS results in generating the same output key pair and further provided that shared key segment KS is not derivable from public key Q. As described below, public key Q can be used during a recovery process to verify successful reconstruction of shared key segment KS.

User interaction module 230 can operate a user interface of user device 202 to allow the user to select a set of M shareholders to receive shares $\{KS_1, KS_2, \ldots, KS_M\}$ of shared key segment KS. As used herein, a "shareholder" can include any individual or organization that the user expects to have the ability to contact at a future date (e.g., when the user needs recovery key KR) and that the user trusts (in the sense of personal, not cryptographic, trust) to release their shares only with the user's authorization. For example, shareholders can include family members, friends, business acquaintances, data storage service providers (other than the provider of server system 206), or the like. In some embodiments, user interaction module 230 can prompt the user to select the M shareholders from a contacts list stored on user device 202 and/or to create contact records for shareholders the user wishes to include. In some embodiments, user interaction module 230 can identify an "address" of a shareholder device 208 corresponding to each shareholder designated by the use; addresses can be identified based on express user input or from the selected contact records. For example, depending on implementation, the "address" of the shareholder device can be a phone number or MAC address associated with the device, an email address associated with the shareholder (assuming the shareholder's email address can be associated with a specific device that is to hold the share), or any other information usable to route information to a specific shareholder or shareholder device 208.

Information distributor module 232 can communicate via network 204 with various devices including server system 206 and shareholder devices 208 to distribute primary key segment KP and key shares $\{KS_1, KS_2, \ldots, KS_M\}$. In embodiments described herein, primary key segment KP is always delivered to server system 206; as described below, this makes server system 206 a required participant in any reconstruction of recovery key KR. Key shares $\{KS_1, KS_2, \ldots, KS_M\}$ are delivered to shareholder devices 208(1)-208(M), with each shareholder device 208(i) receiving a different share $KS_i$. In addition public key Q generated by key pair generator 228 can also be delivered to server system 206; as described below, this can allow server system 206 to verify recovery of shared key segment KS during a recovery process. In some embodiments, information distributor module 232 can include or invoke cryptographic operations to secure the transmitted information and/or to verify the identity of the recipient prior to transmitting the information.

Figure 3:
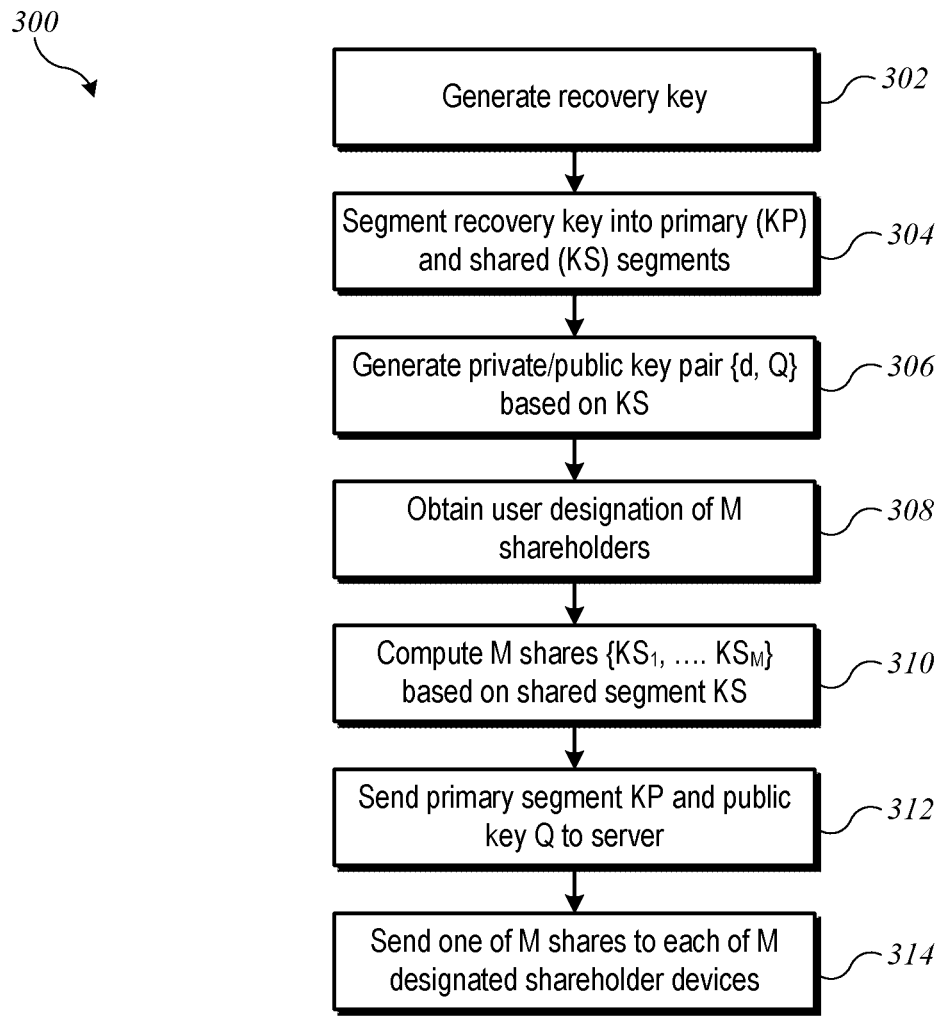
FIG. 3 shows a flow diagram of an enrollment process according to an embodiment of the present invention.

Operation of enrollment code modules 220 can be further understood with reference to FIG. 3, a flow diagram of an enrollment process 300 according to an embodiment of the present invention. Process 300 can be performed, e.g., in user device 202 of FIG. 2 and can be implemented using enrollment code modules 220.

At block 302, user device 202 can generate a recovery key KR, e.g., by operation of recovery key generator 222. At block 304, user device 202 can segment recovery key KR into primary key segment KP and shared key segment KS, e.g., by operation of recovery key segmenter 224. At block 306, user device 202 can generate a private/public key pair $\{d, Q\}$ based on shared key segment KS, e.g., by operation of key pair generator 228.

At block 308, user device 202 can obtain user designation of M shareholders, e.g., by operation of user interaction module 230. In some embodiments, the user can select the number of shares (and therefore the number of shareholders) M within a range and/or the threshold number t of shares needed to reconstruct shared key segment KS; such selections can also be supported by user interaction module 230, e.g., by providing appropriate prompts and user input options. In other embodiments, either or both of M and t can be preselected (e.g., hard-coded values within the software). At block 310, user device 202 can compute M key shares $\{KS_1, KS_2, \ldots, KS_M\}$ from shared key portion KS, e.g., by operation of share generator 226.

At block 312, user device 202 can send primary key segment KP and public key Q to server system 206, e.g., by operation of information distributor module 232. In some embodiments, server system 206 can securely store primary key segment KP and public key Q as recovery data for the user. It should be noted that since KP and Q alone are insufficient to reconstruct KR, secured user data 212 can remain secure even if KP and Q are compromised. At block 314, user device 202 can send a different key share KSi to each shareholder device 208(i) (for 1≤i≤M), e.g., by operation of key distribution module 234. In some embodiments, each shareholder device 208(i) can securely store its respective share KSi to protect against data theft. It should be noted that since any subset of shares KSi (including the improper subset consisting of all M shares KSi) is insufficient to reconstruct recovery key KR in the absence of KP, secured user data 212 can remain secure even if some or all of the M shares KSi are compromised.

After distributing the information, user device 202 can destroy any locally stored copies of KR, KP, KS, $\{KS_1, KS_2, \ldots, KS_M\}$, and $\{d, Q\}$. Thus, recovery key KR need not be retained anywhere in system 200, and no one device needs to retain sufficient information to reconstruct KR.

Instead, as a result of process 300, information sufficient to reconstruct recovery key KR can be distributed across multiple devices, including server system 206 and shareholder devices 208(1)-208(M). As described below, recovery key KR can be reconstructed by retrieving primary key segment KP from server system 206 and at least t of the M key shares $\{KS_1, KS_2, \ldots, KS_M\}$ from shareholder devices 208. The retrieved key shares can be used to reconstruct KS, and KS and KP can be used to reconstruct KR. Thus, information from at least t+1 participant devices is necessary for reconstructing KR. In such embodiments, the trust is said to be distributed, as the secret is protected against an attack on or renegade behavior of any one device.

Figure 4:
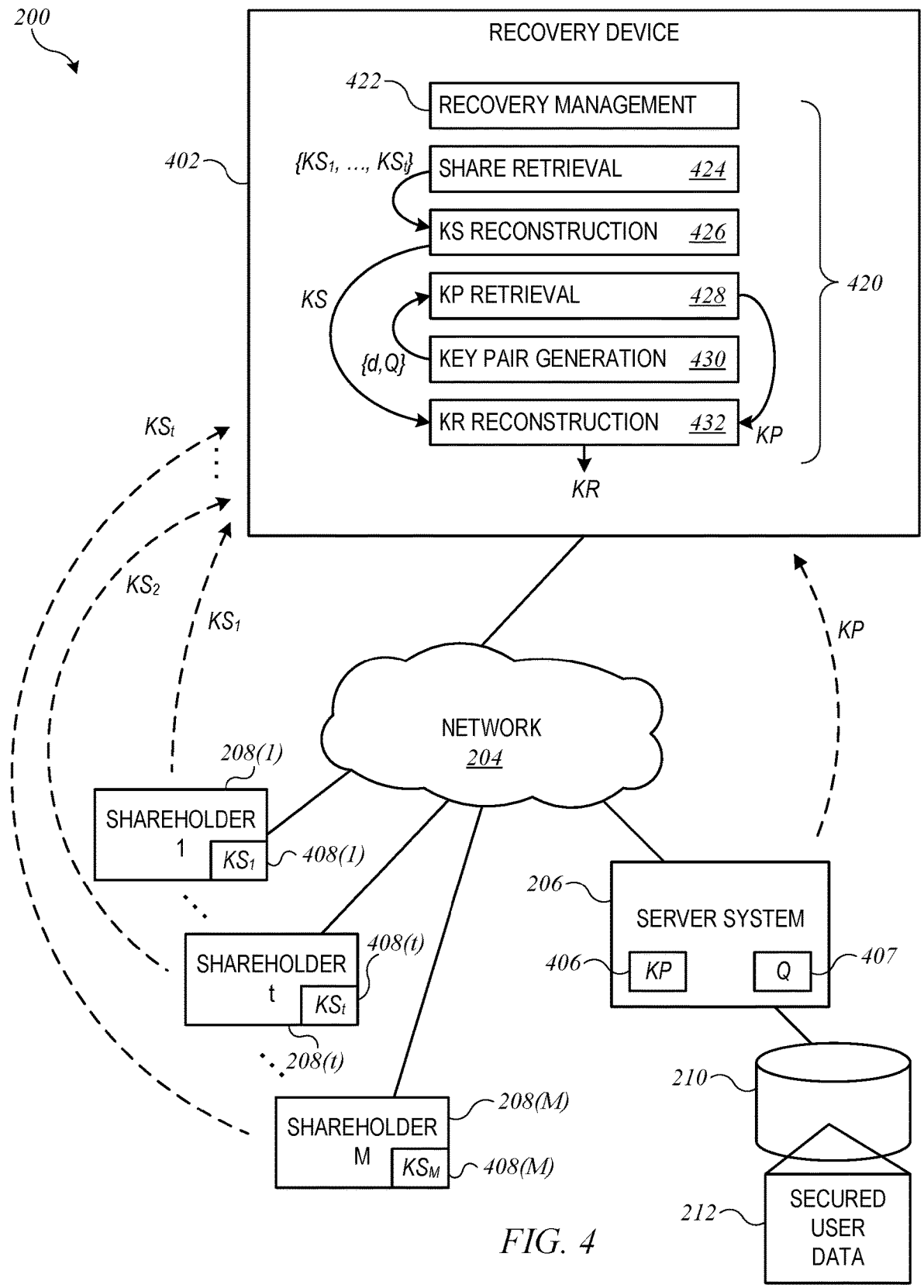
FIG. 4 shows a simplified example of operation of system to reconstruct a user secret according to an embodiment of the present invention.

FIG. 4 shows a simplified example of operation of system 200 to reconstruct recovery key KR according to an embodiment of the present invention. System 200 is shown at a time after enrollment. Accordingly, each shareholder device 208(i) is in possession of a key share (KSi) 408, and server system 206 is in possession of primary key segment (KP) 406 and public key (Q) 407.

At the time represented in FIG. 4, a "recovery device" 402 is connected to network 204. Recovery device 402 can include any type of user-operable electronic device that is capable of communicating with other devices (including, e.g., server system 206) via network 204. For example, recovery device 402 can be a desktop computer, laptop computer, smart phone, other mobile phone, tablet computer, wearable computing device, or the like. In some embodiments, recovery device 402 can be the same device as user device 202. However, it is contemplated that a user may need to reconstruct recovery key KR due to loss (or inoperability) of user device 202, and recovery device 402 need not be the same device as user device 202. In some instances, user device 202 and recovery device 402 can be devices of disparate types (e.g., user device 202 might be a smart phone while recovery device 402 is a laptop computer). It is assumed that recovery device 402 does not have standard key 214.

For purposes of obtaining recovery key KR, recovery device 402 can include recovery code modules 420, which can be implemented, e.g., as software or firmware programs executing on a programmable processor. Recovery code modules 420 can include recovery management module 422, share retrieval module 424, shared key segment reconstruction module 426, key pair generation module 428, primary segment retrieval module 430, and key reconstruction module 432.

Recovery management module 422 can manage a process of recovering access to secured user data 212, including the reconstruction of recovery key KR. In some embodiments, recovery management module 422 can communicate with server system 206 to initiate a recovery process, which can include providing verification of the user's identity to server system 206 and obtaining various information from server system 206 and/or the user that may facilitate the recovery process, examples of which are described below. In some embodiments, recovery management module 422 can invoke other recovery modules 420 during the course of the recovery process.

Share retrieval module 424 can perform operations to retrieve key shares KSi from shareholder devices 208. In some embodiments, share retrieval module 424 can conduct a retrieval transaction with a shareholder device 208(*i*) via network 204. Conducting the retrieval transaction can include, e.g., establishing a secure communication channel with shareholder device 208(*i*), performing user identity verification with shareholder device 208(*i*) (e.g., to establish that a request for the share KSi has been instigated by the user), and receiving the share KSi. In some embodiments, recovery management module 422 can invoke share retrieval module 424 repeatedly to retrieve at least t of the M shares KSi from different shareholder devices 208.

Shared segment (KS) reconstruction module 426 can receive the shares KSi retrieved by share retrieval module 424 and can use the received shares KSi to reconstruct shared key segment KS, e.g., by executing an appropriate reconstruction algorithm. The particular reconstruction algorithm can correspond to the algorithm implemented in share generator 226 described above. In some embodiments, any t of the M shares KSi can be used to reconstruct shared key segment KS, while fewer than t shares are insufficient.

Primary segment (KP) retrieval module 428 can communicate with server system 206 to retrieve primary segment KP. In some embodiments, primary segment retrieval module 428 can implement a cryptographic proof protocol to demonstrate possession of the correct shared key segment KS to server system 206. For instance, after reconstructing shared key segment KS, primary segment retrieval module 428 can invoke key pair generator 228 (which can be identical to key pair generator 228 of FIG. 2) to regenerate private/public key pair $\{d, Q\}$ from reconstructed shared key segment KS. The cryptographic proof protocol can include a challenge/response protocol in which server system 206 provides a random string to be digitally signed by recovery device 402 using regenerated private key d; server system 206 can verify the signature using its previously stored copy of public key Q 407. If shared segment reconstruction module 426 has correctly reconstructed KS, then the regenerated private key d will correspond to public key Q and the signature can be verified. If not, the challenge can fail, and server system 206 can refuse to release primary key segment KP.

Key reconstruction module 432 can reconstruct recovery key KR from reconstructed shared key segment KS provided by shared segment reconstruction module 426 and retrieved primary key segment KP provided by primary segment retrieval module 428. For instance, if KS and KP were originally generated such that XOR(KS, KP)=KR, key reconstruction module 432 can perform the logical XOR operation on reconstructed KS and retrieved KP, resulting in a reconstructed KR. Thereafter, reconstructed KR can be used by recovery management module 422 to continue the recovery process, e.g., by using reconstructed recovery key KR to obtain access to secured user data 212. Those skilled in the art will recognize that using a recovery key to obtain access to data can be independent of how the recovery key is obtained; accordingly, recovery keys reconstructed in the manner described herein can be used in connection with any data recovery process.

Figure 5:
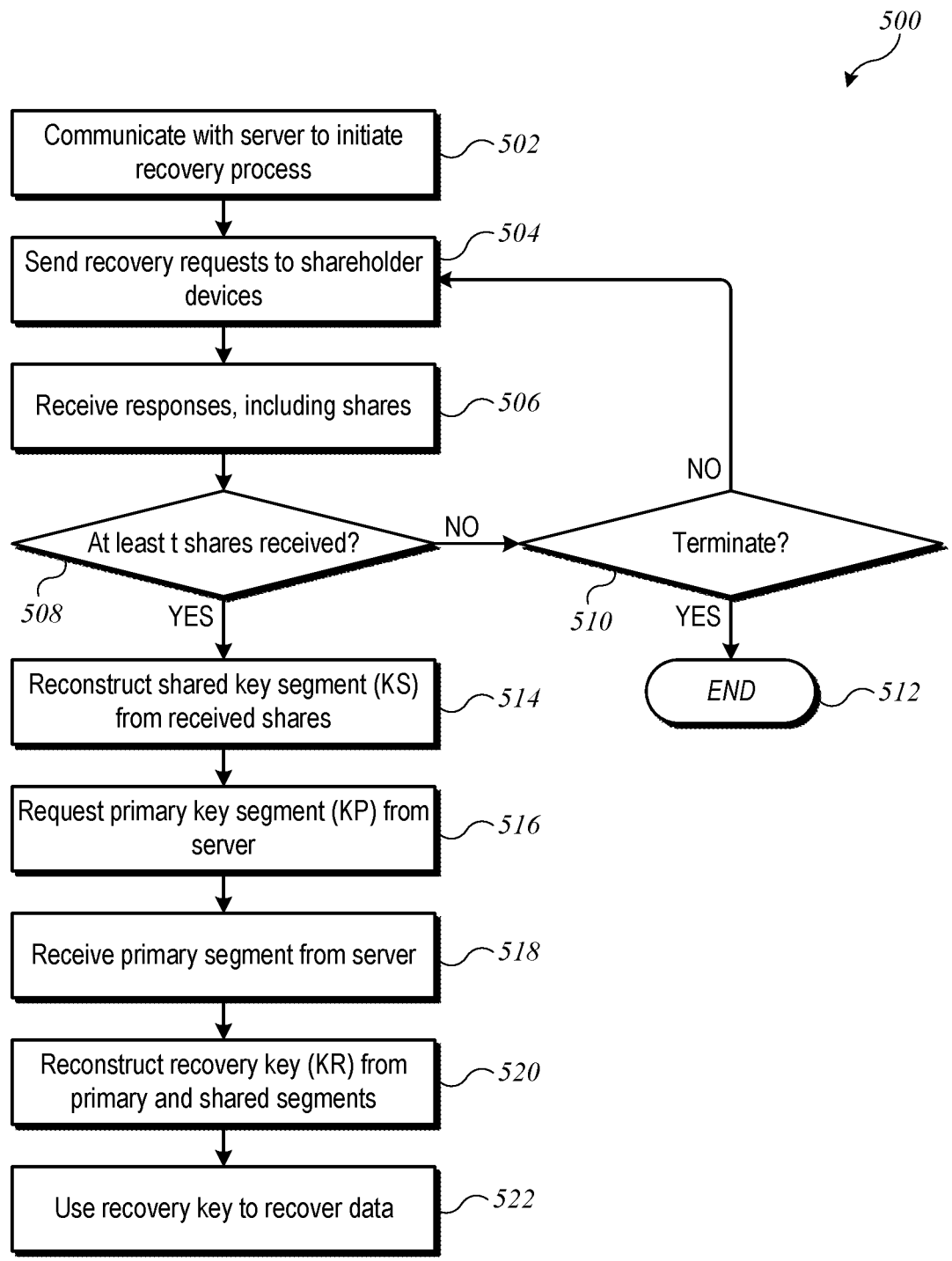
FIG. 5 shows a flow diagram of a recovery process according to an embodiment of the present invention.

Operation of recovery code modules 420 can be further understood with reference to FIG. 5, a flow diagram of a recovery process 500 according to an embodiment of the present invention. Process 500 can be performed, e.g., in recovery device 402 of FIG. 4 and can be implemented in recovery code modules 420.

At block 502, recovery device 402 can communicate with server system 206 to initiate a recovery process. For example, the user operating recovery device 402 can invoke a system function of recovery device 402 indicating that recovery of access to secured user data 212 should be attempted. Invoking the system function can result in recovery device 402 launching recovery management module 422. In some embodiments, initiating the recovery process can include performing various operations with server system 206 to verify the user's identity as the authorized user of secured user data 212; examples are described below. In some embodiments, server system 206 can instruct recovery device 402 to abort the recovery process (e.g., if the user's identity cannot be verified), in which case process 500 can end (not expressly shown).

At block 504, recovery device 402 can send recovery requests to shareholder devices. For example, recovery management module 422 can prompt the user to identify at least the threshold number t of the M shareholders (or shareholder devices 208) that received shares during the enrollment process described above. The user can identify a shareholder by name, phone number, email address, or any other identifier usable to communicate with a shareholder device. Based on the user response, recovery management module 422 can invoke share retrieval module 424 to retrieve shares from identified shareholders.

At block 506, recovery device 402 can receive responses from the shareholder devices, e.g., by operation of share retrieval module 424. The responses can include key shares KSi. As described below, a shareholder device 208(*i*) can place various conditions on the release of its share KSi, and a share KSi may be returned only if applicable conditions are satisfied. Thus, it is possible that all, some, or none of the requests at block 504 result in receiving a share KSi at block 506.

At block 508, recovery device 402 can determine whether at least the threshold number t of shares KSi have been received. If not, then at block 510, recovery device 402 can determine whether to terminate the recovery process. This determination can be based on various conditions, such as a timeout condition (e.g., terminate after 30 minutes or an hour if fewer than t shares have been obtained), a limit on the number of failed attempts (e.g., terminate if at least a minimum number of requests for shares have been denied), or the like. If the determination is made to terminate the recovery process, process 500 can end at block 512; otherwise, process 500 can return to block 504 to continue the attempt to retrieve shares.

Once the threshold number t of shares have been received, at block 514, recovery device 402 can reconstruct shared key segment KS using the received shares, e.g., by operation of shared segment (KS) reconstruction module 426. As noted above, in some embodiments, any subset of at least t of the M shares KSi is sufficient to reconstruct KS, in which case it does not matter which of the M shares were or were not retrieved.

At block 516, recovery device 402 can request primary key segment KP from server system 206, e.g., by invoking primary segment retrieval module 428. At block 518, recovery device 402 can receive primary key segment KP from server system 206, e.g., by operation of primary segment (KP) retrieval module 426. As noted above, in some embodiments this transaction may include providing proof that recovery device 402 is in possession of the correct shared key segment KS. For instance, KP retrieval module 426 can invoke key pair generation module 430 to generate a key pair {d, Q} from reconstructed shared key segment KS and can use the key pair to respond to a cryptographic challenge from server system 206, e.g., as described above.

At block 520, recovery device 402 can reconstruct recovery key KR from reconstructed shared key segment KS and retrieved primary key segment KP, e.g., by operation of key reconstruction module 432. At block 522, recovery device 402 can use the reconstructed recovery key KR to recover access to secured user data 212, e.g., by operation of recovery management module 422.

Using process 500, access to secured user data 212 can be recovered by reconstructing recovery key KR. In some embodiments, reconstruction of recovery KR succeeds only if server system 206 and at least t of M shareholder devices 208 release their stored information to recovery device 402. This can provide increased security as compared to having a single trusted entity holding the recovery key. For instance, an intruder (or unauthorized party) who managed to compromise the security of any one of the information-holding devices in system 200 would not obtain information sufficient to reconstruct KR; security would have to be compromised at multiple devices. In some embodiments, each of shareholder devices 208 and server system 206 makes an independent determination whether to release the information it holds, and the determination in at least some instances can incorporate user identity verification. Thus, a party seeking to reconstruct recovery key KR may need to pass multiple independent user identity verification tests. In some embodiments, these tests can include personal communication with someone (e.g., a shareholder) who knows the user. Examples of incorporating user identity verification in connection with a recovery process such as process 500 will now be described.

Figure 6A:
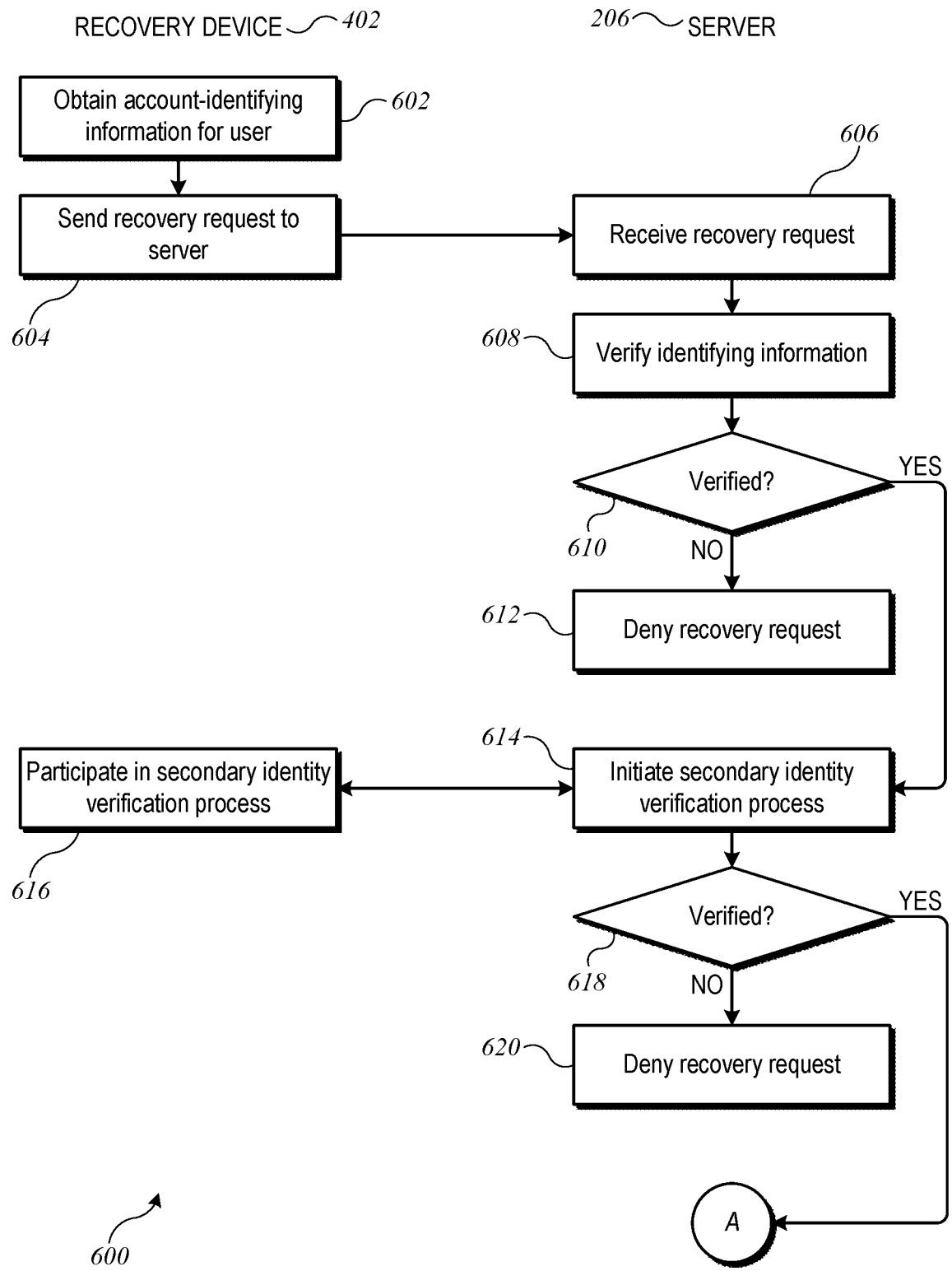
FIGS. 6A and 6B show a flow diagram of a process for recovery of a master segment according to an embodiment of the present invention.
Figure 6B:
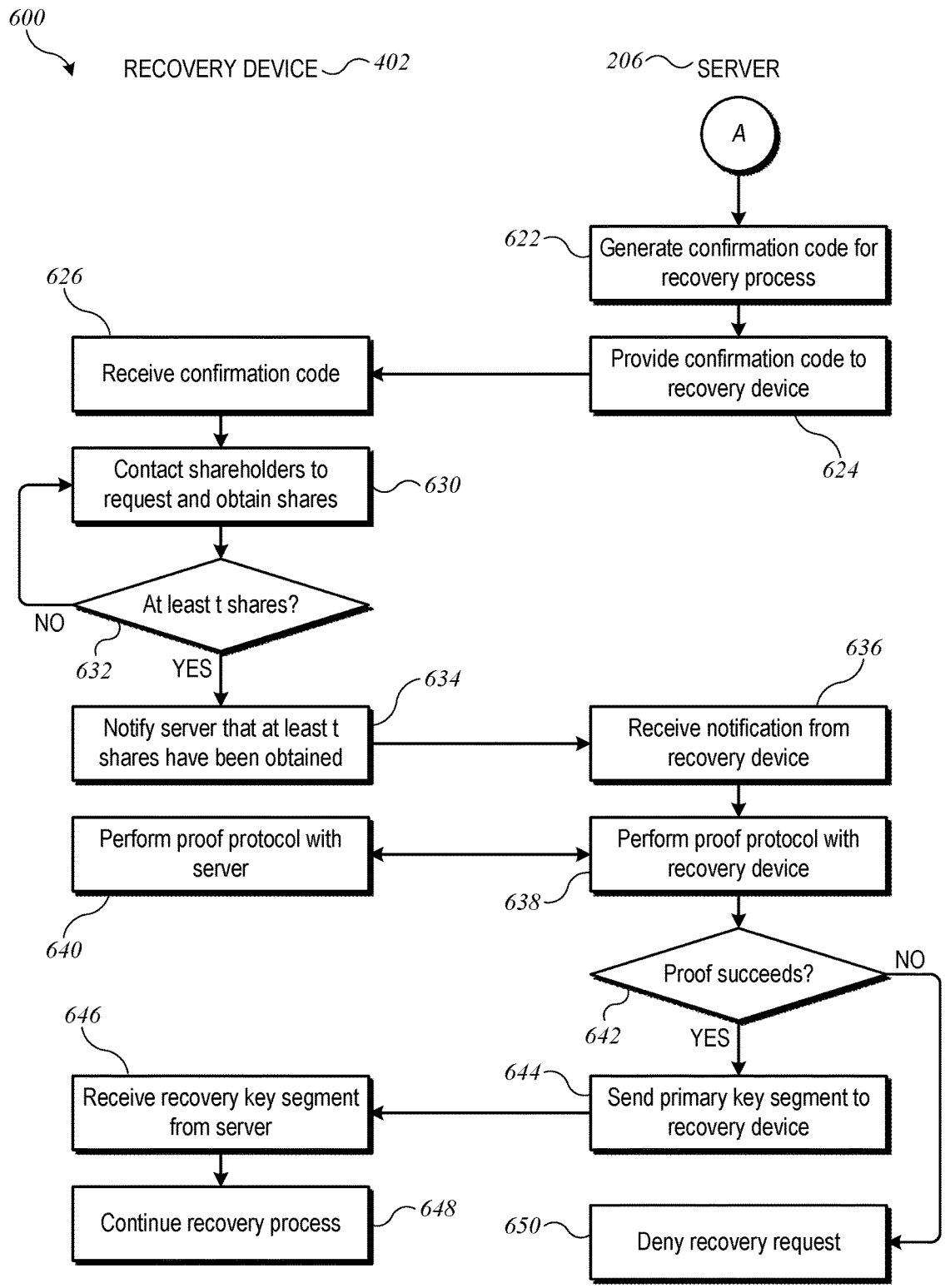

FIGS. 6A and 6B show a flow diagram of a process 600 for recovery of master key segment KP according to an embodiment of the present invention. Portions of process 600 can be performed by a recovery device such as recovery device 402 of FIG. 4 (e.g., in connection with process 500 of FIG. 5), and portions of process 600 can be performed by a server system such as server system 206 of FIG. 4 that holds (e.g., in secure storage) a previously generated master key segment KP 406 and associated public key Q 407. It is assumed that server system 206 holds KP and Q in connection with identifying information for a user account maintained at server system 206.

Referring first to FIG. 6A, at block 602, recovery device 402 can obtain account-identifying information for the user whose recovery key KR is to be reconstructed. For example, as described above with reference to block 502 of process 500, a user can invoke a system function of recovery device 402 to initiate account recovery. In response, recovery device 402 (e.g., by operation of recovery management module 422) can prompt the user to provide account-identifying information for the account to be recovered. For instance, the user can be prompted to provide a username and/or password for the account. At block 604, recovery device 402 can send a recovery request to server system 206. The recovery quest can include the account-identifying information, and sending the request can include establishing a secure channel for communicating with server system 206.

At block 606, server system 206 can receive the recovery request. At block 608, server system 206 can verify the account-identifying information. If, at block 610, the verification fails, then at block 612, the server system can deny the recovery request and process 600 can end. If, at block 610, the verification succeeds, process 600 can continue.

In some embodiments, the fact that recovery device 402 is in possession of account-identifying information (e.g., a username and password) for a user account might not be considered sufficient verification that the operation of recovery device 402 is authorized by the user to whom the account in question belongs. Accordingly, to obtain further confirmation of user identity, at block 614, server system 206 can initiate a secondary verification process, and at block 616, recovery device 402 can participate in the secondary verification process. Any type of identity verification process can be used, depending on the degree of confidence desired and the particular identity verification protocols that have been implemented in connection with server system 206. For example, the user can be prompted to answer security challenge-response questions at enrollment time (e.g., questions such as "what was the name of your favorite teacher?" or "what model was your first car?"), and the secondary verification process at blocks 614 and 616 can include obtaining answers to one or more of the security questions via recovery device 402 and determining, by server system 206, whether the answers from recovery device 402 match the enrollment-time answers from the user. As another example, the user can be prompted to provide a biometric identifier (e.g., fingerprint, voice sample, photo or image) via recovery device 402, and server system 206 can match the biometric identifier to a corresponding identifier collected at enrollment time. As yet another example, server system 206 can send a confirmation code to the authorized user via a channel independent of recovery device 402 (e.g., text message or email to a phone number or email address provided by the user at enrollment time), and recovery device 402 can prompt its user to enter the confirmation code, then transmit the entered code to server system 206, which can verify the match. As still another example, the user can be prompted to go to a retail store or other physical location affiliated with the provider of server system 206 and present identification (e.g., a driver's license or passport) to an employee there, who can provide confirmation to server system 206. Those skilled in the art will appreciate that any of these and/or other secondary identity verification processes can be implemented, with the choice depending on the degree of security desired, weighed against potential inconvenience to users. Further, a secondary identity verification process is not required, and blocks 614 and 616 can be omitted. As described below, shareholder devices 208 may provide identity verification, and server system 206 can, to at least some extent, rely on the shareholders to verify the user's identity.

If, at block 618, the secondary identity verification process fails, then at block 620, the server system can deny the recovery request and process 600 can end. If, at block 618, the secondary verification succeeds, process 600 can continue (node A).

Referring now to FIG. 6B, at block 622, server system 206 can generate a confirmation code to be used for the recovery process, and at block 624, server system 206 can provide the confirmation code to recovery device 402. Recovery device 402 can receive the confirmation code at block 626. As described below, in some embodiments, the confirmation code can be used by shareholder devices 208 to verify a request to retrieve their key shares KSi. In some embodiments, shareholder devices can use a different verification process, and blocks 622-626 can be omitted.

At block 630, recovery device 402 can begin contacting shareholder devices 208 to request and obtain their key shares KSi. Various processes and protocols to retrieve shares can be implemented; examples are described below. At block 632, recovery device 402 can determine whether at least t shares have been obtained, and if not, recovery device 402 can continue contacting shareholder devices 208. As described above with reference to process 500, in some embodiments requesting of shares can terminate before at least t shares are received, in which case the recovery process can exit.

Assuming that at least t shares are obtained, at block 634, recovery device 402 can notify server system 206 that at least t shares have been obtained. At block 636, server system 206 can receive the notification. At blocks 638 and 640, server system 206 and recovery device 402 can perform a proof protocol to verify that recovery device 402 is in possession of the correct shared key segment KS. For example, as described above, during enrollment, server system 206 can receive and store a public key Q that is derived from shared key segment KS. During recovery (e.g., at block 640), recovery device 402 can reconstruct shared key segment KS from the at least t shares KSi obtained via block 630 and can use the reconstructed KS to compute a private/public key pair {d, Q}. Server system 206 can issue a cryptographic challenge, e.g., by generating and sending a nonce (e.g., a random byte sequence) to recovery device 402. Recovery device 402 can digitally sign the nonce using private key d and send the signed nonce to server system 206. Server system 206 can use its stored public key Q to verify the signature and thereby determine whether recovery device 402 is in possession of the correct shared key segment KS. Other proof protocols can be used, provided that the proof protocol does not require server system 206 to have or acquire any knowledge of shared key segment KS.

At block 642, server system 206 can determine whether the proof succeeds. If the proof succeeds, then at block 644, server system 206 can send its stored primary key segment KP to recovery device 402. Recovery device 402 can receive primary key segment KP at block 646 and continue with the recovery process at block 648 (e.g., continuing at block 520 of process 500). If, at block 642, the proof does not succeed, then server system 206 can deny the recovery request at block 650, and process 600 can end.

As described above, server system 206 can incorporate user identity verification into a recovery process, e.g., by refusing to provide master key segment KP to recovery device 402 unless the user identity is verified to the satisfaction of server system 206. Since master key segment KP is a necessary element for reconstructing recovery key KR, this arrangement results in server system 206 being able to unilaterally prevent access to recovery key KR, although server system 206 cannot unilaterally provide access to recovery key KR. Instead, access to recovery key KR also requires participation of at least some of shareholder devices 208.

Figure 7:
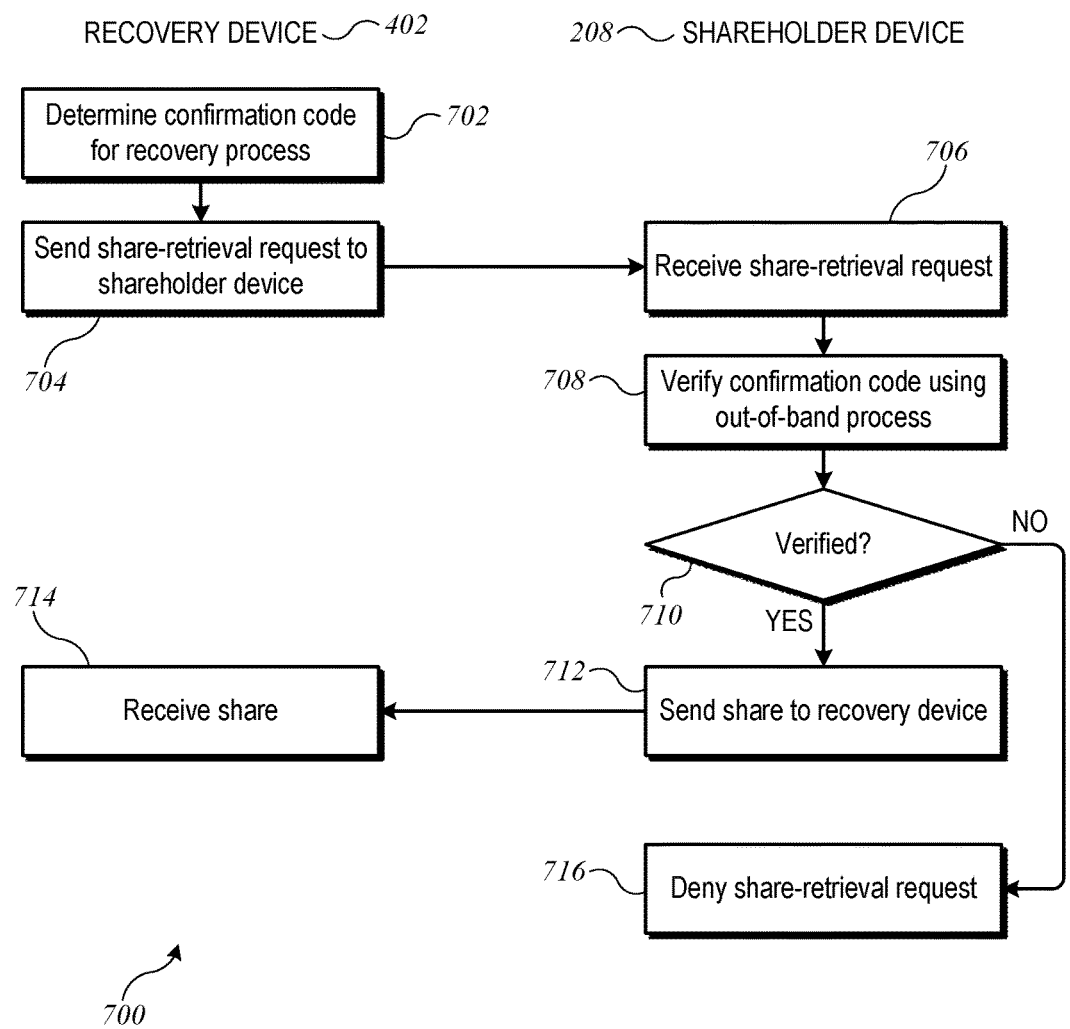
FIG. 7 shows a flow diagram of a process for retrieving a share of a shared segment according to an embodiment of the present invention.

In some embodiments, one or more shareholder devices 208(i) can contribute to user identity verification, e.g., by making release of its share KSi contingent on the shareholder (e.g., the owner of shareholder device 208(i)) verifying the identity of the user of recovery device 402. FIG. 7 shows a flow diagram of a process 700 for retrieving a key share KSi according to an embodiment of the present invention. Portions of process 700 can be performed by a recovery device such as recovery device 402 during a recovery process (e.g., as part of process 500 or process 600 described above), and portions of process 700 can be performed by a shareholder device 208.

At block 702, recovery device 402 can determine a confirmation code for the recovery process. In some embodiments, as described above with reference to FIG. 6B, recovery device 402 can obtain the confirmation code from server system 206. In other embodiments, recovery device 402 can generate a confirmation code. The confirmation code can be, e.g., a four-digit or six-digit random number.

At block 704, recovery device 402 can send a share retrieval request to a shareholder. For example, as described above, recovery device 402 can prompt its user to provide contact information for a particular shareholder device 208 (or for the shareholder to whom shareholder device 208 belongs). Recovery device 402 can use this information to send the share retrieval request. A variety of communication channels can be used, and in some embodiments, the channel can be a secure channel. In some embodiments, the share retrieval request can include the confirmation code.

At block 706, shareholder device 208 can receive the share retrieval request. At block 708, shareholder device 208 can verify the confirmation code using an out-of-band channel. For example, in some embodiments, the confirmation code can be provided by the user of recovery device 402 to the shareholder operating shareholder device 208, e.g., by a phone call or text message or face-to-face communication. In one specific example, recovery device 402 can display the confirmation code on its screen, allowing the user to read it, and shareholder device 208 can display a prompt for entry of the confirmation code. The user can call the shareholder and read the confirmation code displayed by recovery device 402; the shareholder can enter the confirmation code into shareholder device 208 at the prompt.

As another example, in some embodiments, shareholder device 208 can verify the confirmation code by communicating with server system 206. For instance, as described above, in some embodiments server system 206 can generate a confirmation code for the recovery process. Shareholder device 208 can obtain the confirmation code (e.g., via shareholder input or via the share retrieval request from recovery device 402) and can communicate with server system 206 to confirm that server system 206 issued the confirmation code. This confirmation can be performed without transmitting the confirmation code or the share KSi between shareholder device 208 and server system 206. For instance, shareholder device 208 and server system 206 can use a zero-knowledge proof protocol to determine whether they have matching confirmation codes.

If, at block 710, the confirmation code is verified, then at block 712, shareholder device 208 can send its key share KSi to recovery device 402. Recovery device 402 can receive the share at block 714. In some embodiments, the share can be transmitted using a secure communication channel. If, at block 710, the confirmation code is not verified, then at block 716, shareholder device 208 can deny the share retrieval request, and process 700 can end without recovery device 402 receiving the share.

Process 700 can be performed between recovery device 402 and any of shareholder devices 208. During a recovery process, it is expected that recovery device 402 performs process 700 with at least t different shareholder devices 208, and the same confirmation code or different confirmation codes can be used for different shareholder devices 208. In some embodiments, out-of-band verification at block 708 can be leveraged to provide additional user identity verification. For instance, the shareholders can be people the user personally knows (e.g., friends or family members), and the out-of-band verification can include the shareholder recognizing the user (e.g., based on face or voice or any other cues one person may use to recognize another), thereby providing an explicit identity confirmation. Various security protocols can be implemented to authenticate the devices to each other and to secure the transmission of the key share KSi. For instance, if the confirmation code is exchanged out-of-band, the confirmation code can be used to generate a one-time key for encrypting the key share KSi.

In some embodiments, different shareholder devices participating in the same recovery process can use different verification schemes at block 708. For example, in some embodiments, shareholder device 208 may be able to send authenticated communications to each other (e.g., as a result of a cryptographically strong introduction process performed among shareholder devices 208 at enrollment time). Where this is the case, once at least one shareholder has personally verified the user's identity, other shareholders may not need to do so. For instance, for some number $1 \leq k < t$, the first k shareholder devices that receive the confirmation code can securely notify other shareholder devices that the user identity has been confirmed. Thereafter, the remaining t-k shareholder devices can release their shares with a simplified shareholder interaction (e.g., the shareholder can simply indicate "OK" at a prompt). In such cases, the user may be expected to personally contact at least k shareholders to provide the confirmation code. The number k can be chosen as desired; increasing k may provide increased confidence in the user identity but may also make the recovery process more cumbersome for the user.

The systems and methods described above can provide a mechanism for reconstructing a secret (such as recovery key KR) with an inherently high level of security. Necessary and sufficient information to reconstruct the secret is distributed among multiple participants, such as server system 206 and M shareholder devices 208, in a manner such that the information held by any one participant is insufficient to reconstruct the secret. Instead, reconstructing the secret requires obtaining information from at least t+1 of the participants (server system 206 and at least t of the M shareholder devices), each of which can independently determine whether or not to release the information it holds. Accordingly, at least t+1 separate participants would need to release their information in order for anyone to gain access to the secret. This can provide enhanced protection for the secret, as compared to systems where one participant holds the secret (or sufficient information to determine the secret).

In the examples described, server system 206 is an example of a "mandatory" participant, in that the secret cannot be reconstructed without the specific item of information held by server system 206 (i.e., master key segment KP), even if all M shareholder devices 208 provide the information they hold. This allows the provider of server system 206 to retain control over access to the secret without actually being able to determine or divulge the secret itself.

Each shareholder device 208 can be an "optional" participant, in the sense that as long as at least t shares can be retrieved by recovery device 402, it is not necessary for any specific shareholder device 208 to participate in the recovery. As noted, shareholder devices 208 can be devices owned or operated by individuals (shareholders) known to and trusted by the user to whom the secret belongs, and the recovery process can include the shareholders confirming that the user is in fact trying to reconstruct the secret. By virtue of personal trust in the reliability of the shareholders, the user can obtain a high degree of confidence that the secret will not be divulged without the user's authorization.

It will be appreciated that the systems and processes described are illustrative and that variations and modifications are possible. Process steps described as sequential may be executed in parallel, order of steps may be varied, and steps may be modified, combined, added or omitted. The particular communication channels and protocols used for communication among various devices can be selected as desired. Communications can be secured by using an inherently secure channel or by applying security protocols to establish end-to-end security over an otherwise insecure channel (such as typical TCP/IP channels).

Shareholders can be selected by the user, and shares can be transmitted to the shareholder devices based on the user selection. In some embodiments, the user can tell each shareholder that he has been selected, and the shareholder can instruct the shareholder device to accept the share. Strong introduction processes can be used to verify that each share is being delivered to the intended shareholder device 208. In some embodiments, server system 206 does not receive or store information identifying the shareholders or shareholder devices; where this is the case, an intruder who breaches the security of server system 206 might obtain master key segment KP but would not obtain any information that will facilitate reconstructing shared key segment KS or recovery key KR. In some embodiments, server system 206 may store user-supplied nicknames that help the user remember who the shareholders are without identifying shareholder devices to potential intruders. For instance, a shareholder might be identified as "Mom," which is not useful to an intruder unless the intruder can determine who the user is in real life and further identify the user's mother and her device.

In embodiments described above, the user selects M shareholders, of which at least t would need to provide their shares in order to allow reconstruction of shared key segment KS. The values assigned to parameters M and t can be varied as desired. To the extent that each shareholder makes an independent determination whether to release a share in response to a share retrieval request, a larger value for M and/or a larger value of t relative to M can provide enhanced security by increasing the number of independent participants needed to reconstruct the secret. However, this may also increase the burden on the user at enrollment time (the difficulty of identifying M people willing to act as shareholders is likely to increase with M) and/or at recovery time (the difficulty of locating at least t of the shareholders at any given time is likely to increase with t). It should also be noted that, over time, some shareholders may lose their shares (e.g., through loss or destruction of the shareholder device on which the share is stored); thus, large t relative to M may increase the likelihood that the secret cannot be recovered due to the loss of shares. Further, in some embodiments the user is expected to remember who the shareholders are and how to contact them, and it may be easier to remember the identities of three or four out of five shareholders than thirteen or sixteen out of twenty. In some embodiments, the user can select the values of M and/or t within a range specified by server system 206. For example, the user may be able to select M within a range $5 \leq M \leq 10$ and to select t within a range $(M/2) < t < M$.

In some embodiments, the system can incorporate periodic or occasional verification processes to increase the likelihood that a sufficient number of shares will be available if the user attempts recovery. For example, after enrollment, server system 206 may from time to time issue reminders to the user to verify that the user is still able to contact the shareholders. If the user is concerned about ability to contact enough shareholders, the user can redo the enrollment to designate a different set of shareholders. In addition or instead, if server system 206 or user device 202 (the device on which enrollment was performed) has information identifying shareholder devices 208, server system 206 or user device 202 can contact some or all of shareholder devices 208 and perform a share verification process to verify that each shareholder device 208 still has its share. Where PVSS algorithms are used for generating the shares, the share verification process can allow server system 206 or user device 202 to verify the correctness of shares without gaining knowledge of shared key segment KS. If a problem occurs, such as one or more shareholder devices returning an incorrect share (or no share) or being unreachable, the user can be alerted. In response to the alert, the user may choose to redo the enrollment.

Further, embodiments described above include segmenting the recovery key into two segments: a master segment and a shared segment. Those skilled in the art with access to the present disclosure will appreciate that a key can be segmented into more than two segments and that some or all of the segments can be further segmented into shares by the application of a secret sharing algorithm as described above. Accordingly, some alternative embodiments may provide multiple shared segments, with the shares being distributed to different set of shareholders. For instance, the user can define a set of "Family" shareholders and a set of "Friends" shareholders. Other groupings can be used, and some embodiments may require that the sets be disjoint (i.e., no shareholder can be in more than one set). The recovery key (or other user secret) can be segmented into a master segment KP and two shared segments KSA and KSB such that all three segments are needed to recover the original secret. Shared segment KSA can be further segmented into a number $M_A$ of shares such that at least a threshold number $t_A$ of the shares are required to reconstruct it, and the shares can be distributed among the Family shareholders. Likewise, shared segment KSB can be further segmented into a number $M_B$ of shares such that at least a threshold number $t_B$ of the shares are required to reconstruct it, and the shares can be distributed among the Friends shareholders. The number of shareholders in each set and the threshold number for reconstructing a shared segment can be the same or different as desired, and the secret sharing algorithms used to generate shares from different shared segments can be the same or different as desired.

In some embodiments, all of the segments of the recovery key (or other user secret) can be treated as shared segments. Where this is the case, recovery may be possible without participation of the server system. Some embodiments can provide multiple master segments (a segment of the recovery key that is not further segmented into shares) that are distributed to multiple "master" devices, and participation of every master device can be required for recovering the secret.

It should also be understood that although the foregoing description makes reference to a "recovery key" as an example of a user secret to be protected, the techniques described are not limited to this example. Any data that the user wishes to retain as a recoverable secret can be handled in the manner described: the secret can be segmented into a primary segment to be held by a mandatory participant (which can be, e.g., an online service to which the secret in question provides access) and a shared segment to be distributed as shares among a set of optional participants (e.g., user-selected shareholder devices). Thereafter, the secret can be reconstructed by obtaining the primary segment from the mandatory participant and a sufficient number of the shares of the shared segment from the optional participants. With this arrangement, the trust can be distributed among multiple participants such that a breach of trust by any one of the participants (whether due to hacking, rogue employees, or any other cause) does not compromise the secret and such that it is unlikely that any entity will be able to recover the secret without the user's knowledge and participation.

Figure 8:
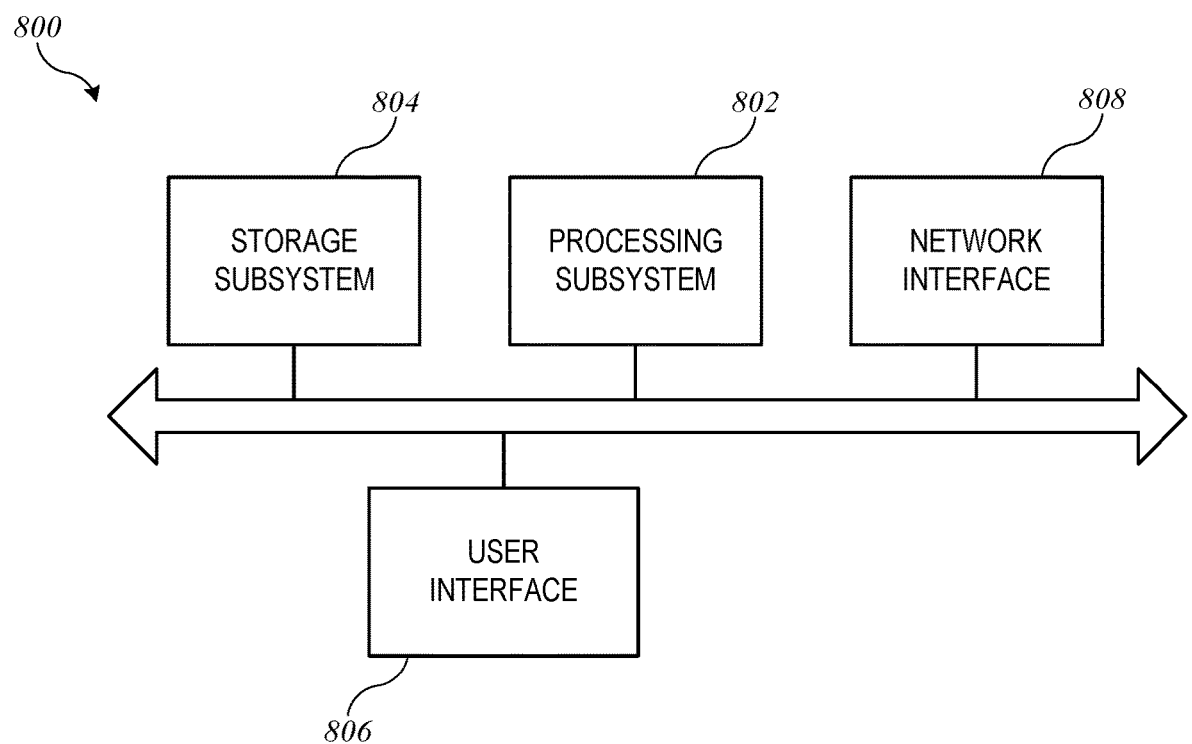
FIG. 8 shows a simplified block diagram of a computer system that can be used in connection with an embodiment of the present invention.

Embodiments described herein can be implemented using computer systems that can be of generally conventional design. FIG. 8 is a simplified block diagram of a computer system 800 that can be used in connection with an embodiment of the present invention. In some embodiments, computer system 800 can implement any or all of the functions, behaviors, and capabilities described herein as being performed by a user device or recovery device (including user device 204 of FIG. 2 and recovery device 402 of FIG. 4), as well as other functions, behaviors, and capabilities not expressly described. In some embodiments, another physical instance of computer system 800 can implement any or all of the functions, behaviors, and capabilities described herein as being performed by a server system (including server system system 206 of FIGS. 2 and 4).

Computer system 800 can include processing subsystem 802, storage subsystem 804, user interface 806, and network interface 808. Computer system 800 can also include other components (not explicitly shown) such as a battery, power controllers, and other components operable to provide various enhanced capabilities. In some embodiments, computer system 800 can be implemented in a consumer electronic device such as a desktop or laptop computer, tablet computer, smart phone, other mobile phone, wearable device, media device. household appliance, or the like. Computer system 800 can also be implemented in a large-scale architecture such as a scalable server system or server farm that can include many interconnected processors, storage systems and interfaces, capable of processing and responding to high volumes of requests from client devices (including user devices and/or recovery devices).

Storage subsystem 804 can be implemented, e.g., using disk, flash memory, or any other non-transitory storage medium, or a combination of media, and can include volatile and/or non-volatile storage media. In some embodiments, storage subsystem 804 can store one or more application and/or operating system programs to be executed by processing subsystem 802, including programs to implement any or all operations described herein as being performed by a user device or recovery device. For example, storage subsystem 804 can store program code implementing any or all of enrollment code modules 220 of FIG. 2 and/or recovery code modules 420 of FIG. 4. In instances where computer system 800 implements a server system, storage subsystem 804 can be implemented using network storage technologies and/or other technologies that can manage high-volume requests to large data stores. For example, storage subsystem 804 can store and manage data repository 210.

User interface 806 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, user interface 806 can also include one or more biometric sensors, such as a fingerprint sensor to generate data representing fingerprint patterns; a camera to capture images; and so on. In some embodiments, a user can operate input devices of user interface 806 to invoke functionality of computer system 800 and can view and/or hear output from computer system 800 via output devices of user interface 806. In instances where computer system 800 implements a server system, user interface 806 (which can include, e.g., an operator console) can be remotely located with respect to processing subsystem 802 and/or storage subsystem 804.

Processing subsystem 802 can be implemented using one or more integrated circuits, e.g., one or more single-core or multi-core microprocessors or microcontrollers, examples of which are known in the art. In operation, processing subsystem 802 can control the operation of computer system 800. In various embodiments, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for computer system 800. For example, where computer system 800 implements user device 202 or recovery device 402, processing subsystem 802 can implement various processes (or portions thereof) described above as being implemented by a user device or recovery device. Processing subsystem 802 can also execute other programs to control other functions of computer system 800, including other programs that may be stored in storage subsystem 804. Where computer system 800 implements server system 206, processing subsystem 802 can implement operations related to enrollment and/or recovery as described above, as well as other operations that may be supported or performed by server system 206.

Network communication interface 808 can provide voice and/or data communication capability for computer system 800. In some embodiments, network communication interface 808 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 808 can provide wired network connectivity (e.g., Ethernet) in addition to or instead of a wireless interface. Network communication interface 808 can be implemented using a combination of hardware (e.g., driver circuits, antennas, modulators/demodulators, encoders/decoders, and other analog and/or digital signal processing circuits) and software components. In some embodiments, network communication interface 808 can support multiple communication channels concurrently, using the same transport or different transports.

It will be appreciated that computer system 800 is illustrative and that variations and modifications are possible. User devices (and recovery devices) implemented using computer system 800 can be portable or non-portable as desired, and any number of user devices and/or recovery devices can communicate with a particular server system. Devices and/or server systems can have functionality not described herein (e.g., a user device may provide voice communication via cellular telephone networks; control mechanisms and/or interfaces for operating an appliance such as a thermostat or door lock; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For instance, in embodiments described above, the user device and recovery device can be different devices. This can allow the user to recover access to the secret even after the user device via which the user performed enrollment is lost, stolen, damaged, or destroyed. However, it is not required that a user use a different device, and in some embodiments, recovery can be performed using the same device that was used for enrollment.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Embodiments described above may involve gathering and use of personal information data to improve the ability of users to recover access to an account. In some instances, this gathered data may include personal information that uniquely identifies or can be used to identify a specific person (e.g., the shareholder or the user). Such personal information data can include demographic data, location-based data, online identifiers, telephone numbers, email addresses, home addresses, or other personal information.

The present disclosure recognizes that the use of such personal information data, in the present technology, can be used to the benefit of users. For example the use of personal information data may provide increased account security by making it more difficult to obtain access to a user account without consent of the user and some number of shareholders. Further, where the shareholders are already contacts of the user, the share can be associated with the user based on contact information that the shareholder device already has (e.g., a phone number or email address of the user). Thus, embodiments can be implemented without sharing personal information data that was not already shared by the user and/or the shareholders. It is also contemplated that a server may obtain information about the shareholders (e.g., nicknames as mentioned above) and such information may be regarded as personal information data.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, a user may be able to opt in or opt out of enrollment in account recovery using shareholders, or the user may be able to deliver a share directly to a shareholder device with the consent of the shareholder device's owner but without identifying the shareholder to any other party. As another example, a user may be able to opt in or opt out of being a shareholder for another user. Notification relating to any access to or use of personal information data is also contemplated. For instance, a user may be notified upon beginning enrollment that personal information data will be accessed and reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure contemplates use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can select and communicate with shareholders without involving any other individual, and the amount and type of data exchanged in connection with providing a share from one device to another (and from a device to a server or vice versa) can be limited.

Thus, although the invention has been described with respect to specific embodiments, it will be appreciated that the invention is intended to cover all modifications and equivalents within the scope of the following claims.

What is claimed is:

1. A method comprising:
   generating, at a user device, a secret, wherein the secret is a cryptographic key used by the user device to encrypt user data;
   identifying, at the user device, a set of M shareholder devices, wherein M is an integer greater than 2;
   generating, by the user device, from the secret, a primary segment and a shared segment such that the primary segment and the shared segment are necessary and sufficient inputs to an algorithm to reconstruct the secret;
   computing, by the user device, based on the shared segment, a set of M shares such that the shared segment is reconstructible using any subset of the shares that includes at least a threshold number t of the M shares and is not reconstructible using any subset of the shares that includes fewer than the threshold number t of the M shares, wherein the threshold number t is greater than 1 and less than M;
   providing, by the user device, the primary segment to a server system for storage; and
   providing, by the user device, a different one of the M shares to each of the M shareholder devices for storage.

2. The method of claim 1 wherein the secret corresponds to a recovery key usable to recover access to user data stored at the server system.

3. The method of claim 1 wherein identifying the set of M shareholder devices includes:
   prompting the user to select M contacts from a contacts list of the user; and
   identifying a shareholder device associated with each of the selected contacts.

4. The method of claim 1 further comprising:
generating, by the user device, a private/public key pair based on the shared segment; and
providing, by the user device, the public key to the server system for storage.

5. The method of claim 1 further comprising:
obtaining, at a recovery device, the respective one of the M shares from each of at least the threshold number t of the M shareholder devices such that at least t of the M shares are obtained;
reconstructing, by the recovery device, the shared segment using the at least the threshold number t of the M shares;
providing, by the recovery device, a proof to the server system that the recovery device has reconstructed the shared segment;
receiving, at the recovery device, the primary segment from the server system, wherein the primary segment is received in response to the proof; and
reconstructing, by the recovery device, the secret using the received primary segment and the reconstructed shared segment.

6. The method of claim 5 further comprising:
generating, by the user device, a first private/public key pair based on the shared segment; and
providing, by the user device, the public key to the server system for storage,
wherein providing, by the recovery device, a proof to the server system that the recovery device has reconstructed the shared segment includes:
generating, by the recovery device, a reconstructed private/public key pair based on the reconstructed shared segment; and
using the reconstructed private/public key pair to respond to a challenge from the server system.

7. The method of claim 5 wherein, for at least a first shareholder device of the M shareholder devices, obtaining the respective one of the M shares includes:
presenting, at a user interface of the recovery device, a confirmation code,
wherein the confirmation code is providable by a user operating the recovery device to a shareholder operating the first shareholder device and wherein the first shareholder device provides the respective one of the M shares to the recovery device in response to the confirmation code.

8. The method of claim 5 wherein the user device and the recovery device are different devices.

9. A method comprising:
receiving, at a server system, a primary key segment from a user device, the primary key segment associated with a user account maintained at the server system for a user;
storing, by the server system, the primary key segment in a data repository in association with the user account; subsequently
receiving, by the server system, a request from a recovery device for the primary key segment;
determining, by the server system, whether the recovery device is in possession of a shared key segment corresponding to the primary key segment, wherein the shared key segment was previously used to compute a set of M shares, wherein M is an integer greater than 2 and wherein the M shares were computed such that the shared key segment is reconstructible using any subset of the shares that includes at least a threshold number t of the M shares and is not reconstructible using any subset of the shares that includes fewer than the threshold number t of the M shares, wherein the threshold number t is greater than 1 and less than M, and wherein the M shares were distributed among M shareholder devices,
wherein the determining includes determining whether the recovery device has obtained at least the threshold number t of the M shares from the shareholder devices; and
in response to determining that the recovery device is in possession of the shared key segment, sending the primary key segment to the recovery device.

10. The method of claim 9 further comprising:
at a time prior to sending the primary key segment, performing a user identity verification operation with the recovery device,
wherein the primary key segment is sent only if the user identity verification operation succeeds.

11. The method of claim 9 further comprising:
receiving, from the user device, at the server system, a public key associated with the primary key segment and the user account, the public key having been determined by the user device based on the shared key segment; and
storing, by the server system, the public key in the data repository in association with the user account and the primary key segment,
wherein determining whether the recovery device is in possession of the shared key segment includes:
sending a cryptographic challenge to the recovery device;
receiving a response from the recovery device, the response including a digital signature; and
determining, based at least in part on the digital signature and the public key, whether the recovery device is in possession of the shared key segment.

12. The method of claim 9 wherein the recovery device and the user device are different devices.

13. The method of claim 9 wherein the primary key segment and the shared key segment are together usable to reconstruct a user secret, the user secret including a recovery key that is usable to recover access to secured user data associated with the user account.

14. A method comprising:
initiating, at a recovery device, a recovery process with a server system for recovery of a user secret that was previously enrolled in a recovery service of the server system, wherein as a result of the previous enrollment, the server system stores a primary segment generated from the user secret and a set of M shareholder devices each stores a respective one of a set of M shares of a shared segment generated from the user secret, wherein M is an integer greater than 2 and wherein the shared segment is reconstructible using any subset of the shares that includes at least a threshold number t of the M shares and is not reconstructible using any subset of the shares that includes fewer than the threshold number t of the M shares, wherein the threshold number t is greater than 1 and less than M;
obtaining, by the recovery device, from at least the threshold number t of the M shareholder devices, the respective shares stored thereby, such that at least the threshold number t of the M shares are obtained;
reconstructing, by the recovery device, the shared segment using the at least the threshold number t of the M shares;

providing, by the recovery device, a proof to the server system that the recovery device has reconstructed the shared segment;

receiving, at the recovery device, the primary segment from the server system, wherein the primary segment is received in response to the proof; and reconstructing, by the recovery device, the secret using the received primary segment and the reconstructed shared segment.

15. The method of claim 14 wherein providing, by the recovery device, a proof to the server system that the recovery device has reconstructed the shared segment includes:

generating, by the recovery device, a reconstructed private/public key pair based on the reconstructed shared segment; and using the reconstructed private/public key pair to respond to a challenge from the server system, wherein, as a result of the previous enrollment, the server system further stores a reference public key previously generated from the shared segment and wherein the response to the challenge is successful in the event that the reconstructed private/public key pair corresponds to the reference public key.

16. The method of claim 14 wherein, for at least a first shareholder device of the M shareholder devices, obtaining the respective one of the M shares includes:

presenting, at a user interface of the recovery device, a confirmation code, wherein the recovery code is providable by a user operating the recovery device to a shareholder operating the first shareholder device and wherein the first shareholder device provides the respective one of the M shares to the recovery device in response to the confirmation code.

17. An electronic device comprising:

a user interface;

a network interface; and a processing subsystem comprising at least one programmable microprocessor, the processing subsystem being coupled to the user interface and the network interface and configured to:

generate a secret, wherein the secret is a cryptographic key used to encrypt user data;

identify a set of M shareholder devices, wherein M is an integer greater than 2;

generate, from the secret, a primary segment and a shared segment such that the primary segment and the shared segment are necessary and sufficient inputs to an algorithm to reconstruct the secret;

compute, based on the shared segment, a set of M shares such that the shared segment is reconstructible using any subset of the shares that includes at least a threshold number t of the M shares and is not reconstructible using any subset of the shares that includes fewer than the threshold number t of the M shares, wherein the threshold number t is greater than 1 and less than M;

provide, via the network interface, the primary segment to a server system for storage; and provide, via the network interface, a different one of the M shares to each of the M shareholder devices for storage.

18. The electronic device of claim 17 wherein the processor is further configured to:

obtain the respective one of the M shares from each of at least the threshold number t of the M shareholder devices such that at least t of the M shares are obtained;

reconstruct the shared segment using the at least the threshold number t of the M shares;

provide a proof to the server system that the electronic device has reconstructed the shared segment;

receive the primary segment from the server system, wherein the primary segment is received in response to the proof; and reconstruct the secret using the received primary segment and the reconstructed shared segment.

19. A server system comprising:

a network interface;

a data repository to store user data associated with a user account; and a processing subsystem comprising at least one microprocessor, the processing subsystem being coupled to the network interface and the data repository and configured to:

receive, via the network interface, a primary key segment from a user device, the primary key segment associated with a user account maintained at the server system for a user;

store the primary key segment in the data repository in association with the user account; subsequently receive a request from a recovery device for the primary key segment;

determine whether the recovery device is in possession of a shared key segment corresponding to the primary key segment, wherein the shared key segment was previously used to compute a set of M shares, wherein M is an integer greater than 2 and wherein the M shares were computed such that the shared key segment is reconstructible using any subset of the shares that includes at least a threshold number t of the M shares and is not reconstructible using any subset of the shares that includes fewer than the threshold number t of the M shares, wherein the threshold number t is greater than 1 and less than M, and wherein the M shares were distributed among M shareholder devices, wherein the determining includes determining whether the recovery device has obtained at least the threshold number t of the M shares from the shareholder devices; and send, in response to determining that the recovery device is in possession of the shared key segment, the primary key segment to the recovery device.

20. The server system of claim 19 wherein the user device and the recovery device are different devices.

* * * * *